US007503001B1

(12) United States Patent
Lekutai

(10) Patent No.: US 7,503,001 B1
(45) Date of Patent: Mar. 10, 2009

(54) TEXT ABBREVIATION METHODS AND APPARATUS AND SYSTEMS USING SAME

(75) Inventor: Gaviphat Lekutai, Kirkland, WA (US)

(73) Assignee: AT&T Mobility II LLC, Atlanta, GA (US)

(*) Notice: Subject to any disclaimer, the term of this patent is extended or adjusted under 35 U.S.C. 154(b) by 372 days.

(21) Appl. No.: 10/282,742

(22) Filed: Oct. 28, 2002

(51) Int. Cl.
*G06F 17/00* (2006.01)

(52) U.S. Cl. .................. 715/261; 715/271; 455/466

(58) Field of Classification Search .......... 455/466, 455/412.1; 715/530, 531, 534, 540, 50, 255, 715/256, 261, 271
See application file for complete search history.

(56) References Cited

U.S. PATENT DOCUMENTS

| | | | | |
|---|---|---|---|---|
| 4,744,050 | A * | 5/1988 | Hirosawa et al. ............. 704/4 |
| 5,838,973 | A * | 11/1998 | Carpenter-Smith et al. ... 717/105 |
| 6,038,559 | A * | 3/2000 | Ashby et al. .................. 707/4 |
| 6,144,653 | A * | 11/2000 | Persson et al. ............... 370/337 |
| 6,188,909 | B1 * | 2/2001 | Alanara et al. ............... 455/466 |
| 6,279,018 | B1 * | 8/2001 | Kudrolli et al. ............... 715/540 |
| 6,313,787 | B1 * | 11/2001 | King et al. .............. 342/357.03 |
| 6,333,973 | B1 * | 12/2001 | Smith et al. ............... 379/88.12 |
| 6,606,373 | B1 * | 8/2003 | Martin ..................... 379/88.01 |
| 6,690,942 | B2 * | 2/2004 | Vikman et al. ............... 455/466 |
| 6,748,450 | B1 * | 6/2004 | Dutta ......................... 709/246 |
| 6,751,209 | B1 * | 6/2004 | Hamiti et al. ................ 370/349 |
| 6,834,312 | B2 * | 12/2004 | Edwards et al. ............. 709/246 |
| 2001/0021936 | A1 | 9/2001 | Bertram |
| 2002/0091500 | A1 * | 7/2002 | Sakaguchi ................... 702/182 |
| 2002/0184270 | A1 * | 12/2002 | Gimson ....................... 707/529 |
| 2003/0003931 | A1 * | 1/2003 | Silventoinen et al. ........ 455/466 |
| 2003/0036842 | A1 * | 2/2003 | Hancock ..................... 701/200 |
| 2003/0107588 | A1 * | 6/2003 | Elsbree et al. .............. 345/700 |
| 2003/0171870 | A1 * | 9/2003 | Guéziec ...................... 701/202 |
| 2003/0224823 | A1 * | 12/2003 | Hurst et al. ................. 455/558 |
| 2004/0205668 | A1 * | 10/2004 | Eastlake .................... 715/531 |

OTHER PUBLICATIONS

Kohavi, Ron, et al, "Evolving Data Mining Into Solutions for Insights: Emerging Trends in Business Analytics", Communications of the ACM, vol. 45, Issue 8, Aug. 2002, pp. 45-48.*
Standardization of Applicant Names, EPO PD 0.4 Manual, pp. 1-29 (1992).

* cited by examiner

*Primary Examiner*—Laurie Ries
(74) *Attorney, Agent, or Firm*—Michael J. Donohue; Davis Wright Tremaine, LLP

(57) ABSTRACT

Text processors are configured to shorten or compact text based on one or more abbreviation libraries or rule libraries. Messaging methods include such text abbreviation processing to reduce message length based on display properties or to enhance user perception. Message length can be reduced based on abbreviations in a standard abbreviation list, a user specific abbreviation list, or a combination of standard and custom lists. In some examples, text length is shortened based on stored rules. Mobile stations that provide messaging services include text processors that reduce message length and can be configured to process text messages prior to transmission or after reception. Text processors are provided in association with word processors and presentation applications, and are configured to produce shortened text strings. In some examples, full-length text remains is stored so that both shortened text and full text are available. Selection of text processor parameters can be based on a graphical user interface.

15 Claims, 6 Drawing Sheets

TEXT ABBREVIATION METHODS AND APPARATUS AND SYSTEMS USING SAME

TECHNICAL FIELD

The disclosure pertains to methods and apparatus for text abbreviation.

BACKGROUND

The rapid and effective presentation and communication of information is important in many applications. For example, short messaging services (SMS) have been developed for wireless communication systems to provide message delivery to network subscribers via a wireless network whenever subscribers are in a wireless service area. Such messages are generally transmitted outside a voice channel so that the subscriber can access these messages while communicating via the voice channel. Typically, these messages are presented on a mobile station display so that they are received by the subscriber for timely response.

Message presentation on wireless mobile stations can be limited because of display capabilities or permissible message lengths. For example, SMS messages are generally limited to 160 characters. In addition, a typical mobile station display can show only a limited number of characters simultaneously, so that displayed message length is typically even less. Computer or workstation applications that use higher resolution displays also exhibit similar drawbacks although such drawbacks appear only for longer messages. In some applications, information display may not be limited by display hardware, but displayed information may be unsuitable for effective communication. For example, many business and academic presentations are based on presentation slides generated with computer presentation applications or word processors. Unfortunately, while such presentation slides can be filled with characters or graphics, presentation slides that include more than a few lines of text or a few graphics are largely ineffective as viewers are unable to process larger amounts of text or graphics in a single presentation slide.

Accordingly, methods and apparatus are needed that provide enhanced communication.

SUMMARY

Text processors comprise an input configured to receive a text string having an initial string length. A text abbreviator is configured to produce an abbreviated text string having a string length that is less than the initial string length and an output that is configured to deliver the abbreviated text string. According to representative examples, text processors further comprise a memory configured to store an abbreviation library, wherein the abbreviated text string is produced based on the abbreviation library. In additional examples, the text processor comprises a memory configured to store a rule library, wherein the abbreviated text string is produced based on the rule library.

Word processors comprise a text input configured to receive a text string having an initial length and a text processor configured to process the text string and produce a processed text string having a processed string length that is less than the initial length. A display is configured to display the processed string. According to representative examples, the text processor includes an abbreviation library or a rule library, wherein the processed text string is produced based on the abbreviation library or the rule library. In additional representative examples, the text processor is configured to retain the text string and the abbreviated text string so that either can be displayed.

Mobile stations comprise a message input configured to receive an input message text and a text processor configured to produce a shortened message text from the input message text. A display is configured to display the shortened message text. In representative examples, the mobile stations further comprise a transceiver configured to transmit or receive the shortened message text. In other examples, the mobile stations comprise a transceiver configured to receive the input message text and deliver the input message text to the text processor. In additional representative examples, the mobile stations comprise a memory configured to store the input message text and the shortened message text. In other representative examples, the mobile stations comprise at least one function key, wherein activation of the function key is configured to display the text message or the shortened text message.

Mobile stations comprise a message input configured to receive a shortened message text and an abbreviation indicator and a display configured to display the shortened message text. In representative examples, the mobile stations further comprise a transmitter configured to transmit a request for delivery of an expanded message text associated with the shortened message text or a source text associated with the shortened message text.

Text processors comprise means for receiving a text message and means for processing the text message to produce an abbreviated text message. In representative examples, the text processors comprise means for selecting an abbreviation extent for the abbreviated text message, and means for selectively displaying the text message and/or the abbreviated text message.

Messaging methods comprise preparing a message text and abbreviating the message text. The abbreviated message text is then transmitted to a message recipient. In representative examples, the message text is abbreviated based on an abbreviation library or a rule library. In a particular example, messaging methods include providing an abbreviation library shared by a message sender and the message recipient. In other messaging methods, a message text is transmitted and abbreviated after reception.

Text processing methods comprise receiving a text string and abbreviating the text string. According to representative examples, the text string is abbreviated based on an abbreviation library or an available display area. In additional representative examples, the text string and the abbreviated text string are stored, and either is selectable for display. In further examples, the text string is abbreviated based on one or more abbreviation or rule libraries. In some examples, such libraries are user configurable or are associated with a specific vocabulary. In other representative examples, the text string is abbreviated based on an abbreviation index associated with a selected abbreviation extent.

User interfaces for computer systems having a graphical user interface, a display, and a user interface selection device comprise retrieving a menu entry associated with a text processor function. The menu entry is displayed and a menu selection signal indicative of the user interface selection device pointing at the menu entry on the display is received. A text processor function associated with the menu entry is performed. In representative examples, the text processor function is text abbreviation or selection of an abbreviation library or an abbreviation library entry.

Network elements comprise a receiver configured to receive a text message and a processor configured to abbreviate the text message. In representative examples, the processor is configured to abbreviate the text message based on one or more abbreviation parameters that are received from a network element or a mobile station. In some examples, the processor is configured to receive at least one abbreviation parameter associated with a message recipient identity or an equipment identity.

These and other features are set forth below with reference to the accompanying drawings.

DETAILED DESCRIPTION

Figure 1A:
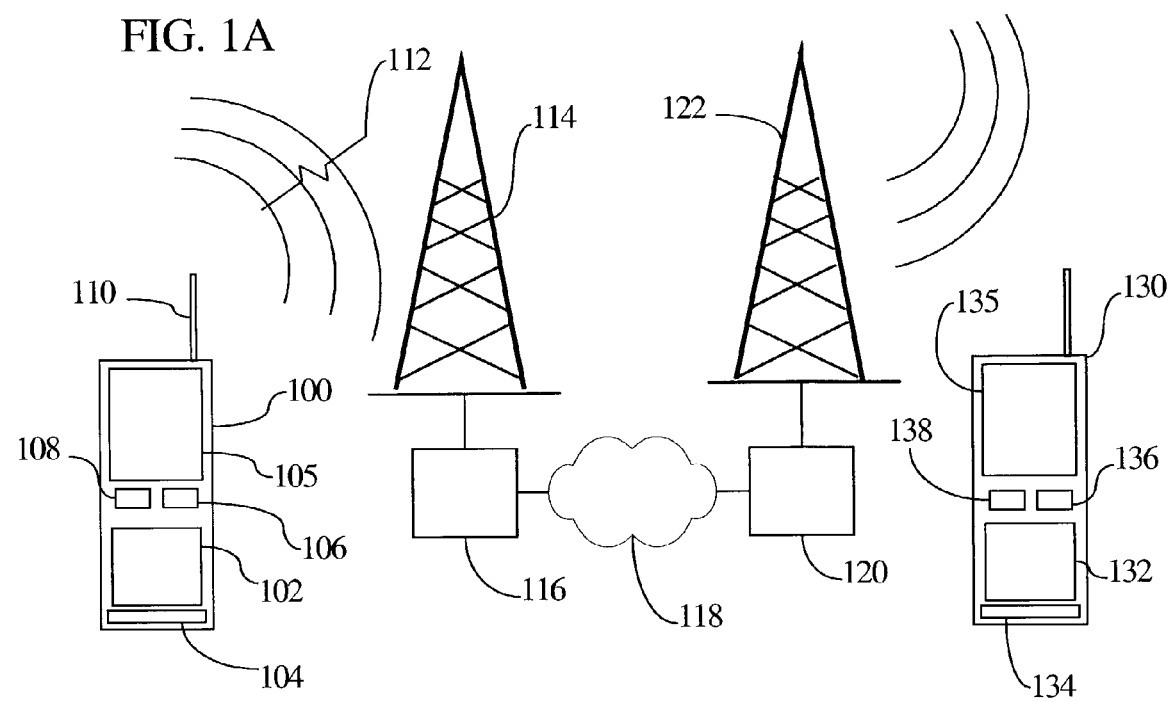
FIG. 1A is a schematic diagram illustrating communication between two mobile stations.

With reference to FIG. 1A, a mobile station 100 includes a keypad 102 and a microphone 104 configured to receive input from a mobile station user, and a display 105 configured to show user inputs, messages, or other information. Other or additional input devices can also be included with the mobile station 100. The keypad 102, the microphone 104, or both are configured to communicate user inputs to a message processor 106 that is in communication with a transceiver 108. The transceiver 108 produces a modulated radio-frequency signal that is delivered to an antenna 110 for transmission via an air interface 112 to a base station 114. The base station 114 is in communication with a wireless communication network 116 and/or a public switched telephone network (PSTN) 118. A wireless communication network 120 is in communication with the PSTN 118 and includes a mobile base station 122. A mobile station 130 is in communication with the wireless network 120 and includes a display 135, a keypad 132, a microphone 134, a message processor 136, and a transceiver 138. As shown in FIG. 1A, a message or other transmission by the mobile station 100 is delivered to the mobile station 130 via the wireless networks 116, 120 and the PSTN 118. In other examples, a message is delivered to a landline telephone, a personal computer or other computer, a personal digital assistant, a computer network, or to other fixed or mobile destinations.

Figure 1B:
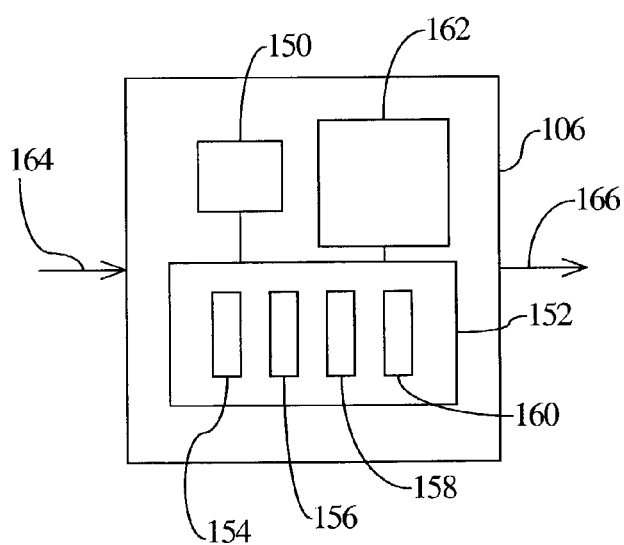
FIG. 1B is a schematic diagram of a message processor.

Referring to FIG. 1B, the message processor 106 includes a controller 150, a memory 152 configured to store a standard abbreviation library 154 and user-customized abbreviation libraries 156, 158. In some examples, the processor 106 is provided in a Subscriber Identity Module (SIM), in a public switched telephone network (PSTN), a portable digital assistant, a personal computer, a server, or at other locations in a communication system. The processor 106 can be a dedicated processor, or can be a processor associated with additional applications. For example, a central processing unit of a personal computer can be configured as such a processor. The memory 152 is also configured to store a rule library 160 that includes one or more abbreviation rules. The memory 152 can also be configured to store computer executable instructions for an abbreviation processor 162. A message or other text provided by the keypad 102 or otherwise provided is received by the message processor 106 at an input 164 and is abbreviated based on one or more of the abbreviation libraries 154, 156, 158 and the rule library 160. For example, the received text can be compared with text stored in one or more of the abbreviation libraries 154, 156, 158 or processed using classification methods based on fuzzy logic or neural networks or other methods using rules stored in the rule library 160. Abbreviation libraries and/or rule libraries can be configured based on message classes or profiles. For example, specific libraries can be associated with personal messages, business messages, family messages, technical messages, recreational messages, messages directed to international destinations, messages intended for non-English speakers, or other message categories. In some examples, more than one library can be selected. Such libraries can be configured to abbreviate based on, for example, words or phrases that are easily recognized within a selected classification. In addition, libraries can be configured for one or more languages so that language-specific libraries are available. Messages in one or more languages can be appropriately shortened based on such libraries.

As a specific example of an abbreviation process, the message "MEET ME AT 6:00 PM AT DOWNTOWN OFFICE BUILDING" can be shortened based on abbreviations in the standard library 154 and/or one or both of the user-customized libraries 156, 158. For example, this message can be shortened to "MEET 6P, DWNTWN OFF BLDG," substantially reducing message length. In this particular example, words such as "AT" or "ME" can be identified in the abbreviation libraries for omission from messages. Vowels can be similarly identified for omission based on a rule stored in the rule library 160. Words such as "building" can be abbreviated based on, for example, a stored abbreviation in the standard library 154. As used herein, shortening of a text string is referred to as abbreviation. Thus, abbreviation includes shortening a text string by, for example, removal of vowels or other characters. The abbreviated message is delivered to an output 166. Details of the message processor 136 are not shown in FIGS. 1A-1B, but the message processor 136 can be generally similar to the message processor 106.

The controller 150 can be arranged to provide user or hardware configurable abbreviation by, for example, selection of which abbreviation libraries or rule libraries are to be used, or to specify a target abbreviation extent. For example, messages that only slightly exceed display capabilities or permitted message lengths can be only slightly abbreviated. Alternatively, messages may be extensively abbreviated between, for example, users who are accustomed to reading abbreviated messages. The extent of message abbreviation can be user selected or can be determined by the message processor based on message properties such as message length. Abbreviation extent can be conveniently selected based on a user-selectable abbreviation index.

While FIGS. 1A-1B illustrate text message processing, voice messages can be similarly processed after conversion to text using, for example, speech recognition software that can be executed by the message processor 106 or by an additional processor Such speech recognition can be applied before or after transmission. A message recipient can recover speech by expanding the abbreviated message and delivering the expanded message to a speech processor. In addition, text input can be received from a graphics tablet using handwriting recognition software based on a conventional alphabet or a specially configured alphabet.

In the example described above, a message is abbreviated before transmission by the mobile station 100 to the mobile station 130. In additional examples, full message text can be transmitted for processing after receipt. For example, the message "MEET ME AT 6:00 PM AT DOWNTOWN OFFICE BUILDING" is transmitted by the mobile station 100, and the message processor 136 in the mobile station 130 shortens the message prior to presenting the message on the display 135. The message processor 136 can be configured so that the message is processed based on, for example, properties of the display 135, the identity of the message sender, or other message characteristics such as message length. For example, the message processor 136 can receive the full message text and determine if the display 135 has space available for the full text. If so, the message can be delivered in its original form to the display 135. If adequate display space is unavailable, the message processor 136 can abbreviate the message based on the display space available. Thus, if the display 135 has considerable space available, only slight abbreviation can be applied by removing only a few characters or abbreviating words having easily recognized abbreviations, based on, for example, a user abbreviation configuration. In other examples, message abbreviation can be based on selected abbreviation or rule libraries that can be configured based on the identity of the message sender. For example, users can agree on abbreviation configurations to reduce ambiguities in abbreviated messages.

Text and message processing as described above can also be provided in other communication applications. For example, email messages can be processed prior to delivery or after receipt to reduce message length and enhance readability. So-called instant messaging applications can also include such text processing so that full message text is converted into shortened instant message text. This conversion can be performed either prior to transmission or after receipt. Abbreviation libraries can be configured based on instant message recipients or recipient groups such as "buddy lists." For example, a particular buddy list can be associated with appropriate abbreviation libraries and rules.

Figure 1C:
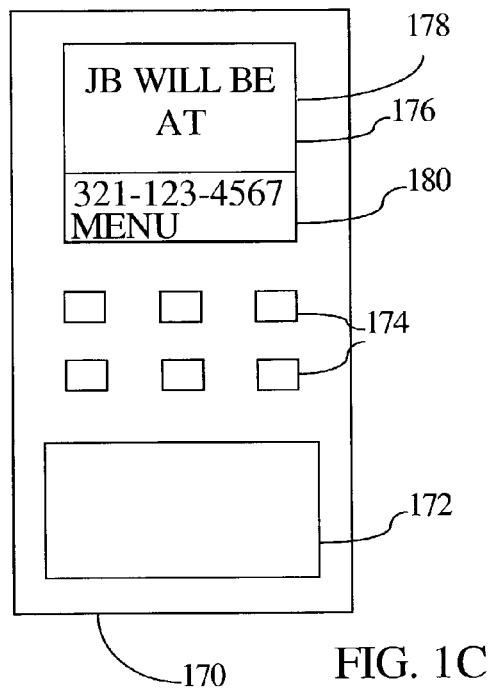
FIG. 1C illustrates display of a message by a mobile station.
Figure 1D:
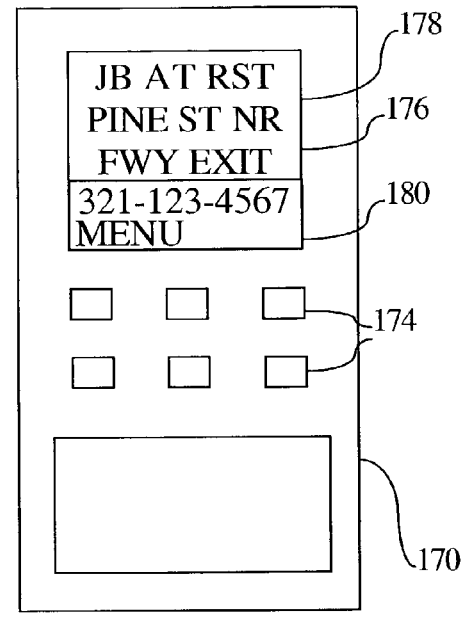
FIG. 1D illustrates display of an abbreviated message by the mobile station of FIG. 1C.

Display of a representative full message and a corresponding abbreviated message is illustrated in FIGS. 1C-1D. With reference to FIG. 1C, a mobile station 170 includes a keypad 172, function keys 174, and a display 176. The mobile station also includes an antenna, transceiver, a message processor, and other features similar to those illustrated in FIG. 1A, but not included in FIGS. 1C-1D. The display 176 is configured to include a message area 178 and an area 180 that is configured to show information regarding current calls, a call log, or other information, and provide access to a mobile station menu. As shown in FIG. 1C, a portion of a message "JB WILL BE AT RESTAURANT ON PINE STREET NEAR FREEWAY EXIT" is displayed in the message area 178. Unfortunately, this message exceeds the capacity of the message area 178, and cannot be displayed in its entirety. FIG. 1D illustrates the mobile station 170 as configured to display a shortened message corresponding to this message. After abbreviation, the entire message can be displayed in the message area 178. This abbreviation can be performed by a message processor with or without user intervention. For example, the user can inspect a portion of the message (as shown in FIG. 1C) and then indicate that the message is to be shortened using one or more of the function keys 174. Alternatively, because the message cannot be displayed in the available message area, the message can be shortened without user intervention based on message length and available display area. The user can select display of the original (unshortened) message using one or more of the function keys 174, and view the entire message using a scrolling operation.

Figure 2A:
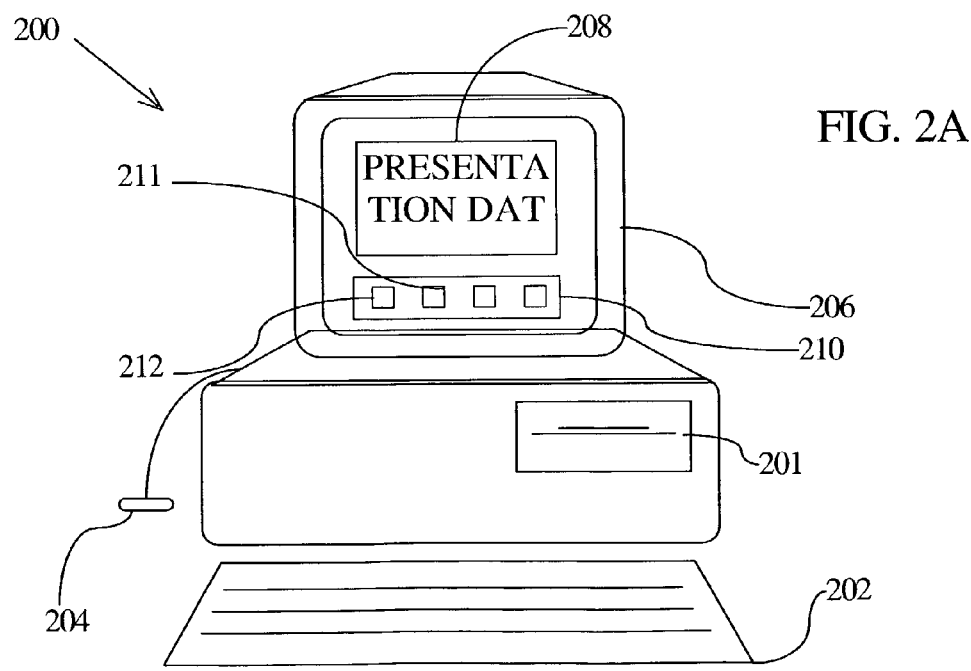
FIG. 2A is a schematic diagram of a computer system that includes a text processor configured to abbreviate text strings.

With reference to FIG. 2A, a personal computer 200 or other computer system is configured to receive and process text generated using a computer-based presentation application, word processor, or other application. The personal computer 200 typically includes a microprocessor, random access memory, read only memory, one or more hard disk drives, a floppy disk drive, and other data storage devices and input/output devices. Voice input can be provided using a microphone in association with speech recognition software. As shown in FIG. 2A, the personal computer 200 includes CD-ROM drive 201 and user input is provided via a keyboard 202 and a mouse 204. System and application information is shown on a display monitor 206 such as a cathode ray tube display, a liquid crystal display, or other display. A network interface can also be provided, but is not shown in FIG. 2A.

The personal computer 200 can be configured to receive text strings produced using the keyboard 202 and the mouse 204 (or other pointing device or other input devices) so that the text strings are processed with word processor application software, presentation application software, graphics software, or other applications. For example, text strings can be associated with flow chart text boxes, other boxed text, display slides, display pages, printed pages, or other display areas having fixed or selectable display dimensions or resolutions. For example, a text processor can be implemented as a series of computer executable instructions configured to selectively shorten input text strings based on, for example, text box dimensions or page sizes. The computer-executable instructions can also be configured to process a presentation application file, a word processor file, other stored text, or can be configured as a software module that processes text during text entry or word processing operations. The text processor can be configured based on parameters such as, for example, a minimum font size, a maximum font size, and/or range of text fonts and font sizes. In addition, the text processor can be configured to request or authorize increases or decreases in text box sizes and to provide one or more abbreviation levels associated with an authorized abbreviation extent. The text processor can also be configured to retain unabbreviated text so that any text ambiguity due to abbreviation can be resolved by display of full text by, for example, selecting an alternative text display such as a full-text display with, for example, a function key, a pointing device such as the mouse 206, a trackball, or other user input device. Retaining unabbreviated text also permits text abbreviation to be executed based on additional or alternative user libraries or standard libraries. For example, abbreviated presentation text can be reprocessed based on a target display size, or based on familiarity of a target audience with standard abbreviations or acronyms associated with presentation subject matter.

Figure 2B:
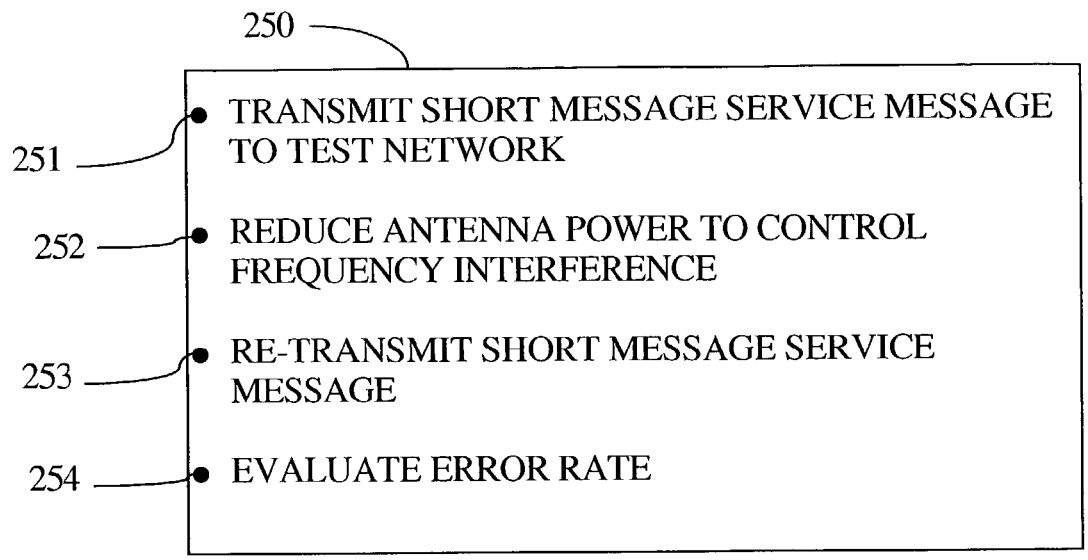
FIG. 2B illustrates a presentation slide.
Figure 2C:
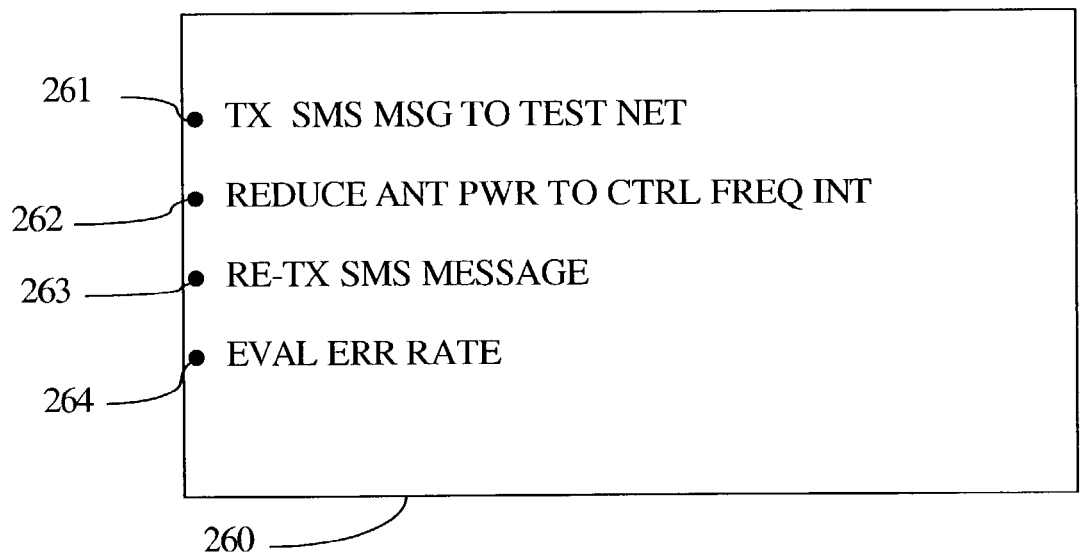
FIG. 2C illustrates a presentation slide based on an abbreviated bullet list.

Referring further to FIG. 2A, the display monitor 206 is configured to display a representative text box 208 as controlled by, for example, a presentation application. A user menu 210 is provided that is associated with selected display regions on the display monitor 206. For example, activating a mouse button with a mouse pointer displayed at a display region 211 can be associated with display of abbreviated text, display of full text, and activating a mouse button at a display region 212 can be associated with selection of abbreviation parameters, or deactivating display of the menu 210. A representative example is illustrated in FIGS. 2B-2C. With reference to FIG. 2B, a presentation slide 250 includes a list of bullet items 251, 252, 253, 254 that correspond to a full text input, without abbreviation or other text reduction. Processing of the full text input is configured to produce a presentation slide 260 that includes a list of abbreviated bullet items 261, 262, 263, 264 as shown in FIG. 2C.

Control of a text processor can be provided based on a menu or other user interface configured for selection of text processor parameters. For example, a so-called "drop-down" menu can be provided that is associated with one or more text processor functions such as abbreviation, library selection, abbreviation level selection, or toggling between full text and abbreviated text. The menu can be displayed in response to a menu entry selection signal provided by a user selection device such as a mouse, keyboard, or the device. An execution signal associated with one or more text processor functions can be provided based on a menu entry selected by a user.

Presentation text, message text, and other text generally include a series of one or more alphanumeric characters. A series of characters is generally referred to as a text string and a number of characters associated with a text string is referred to as a string length. As used herein, such text strings can include page breaks, line breaks, paragraph breaks, and other formatting information and a text processor can be configured to remove such formatting characters.

Figure 3:
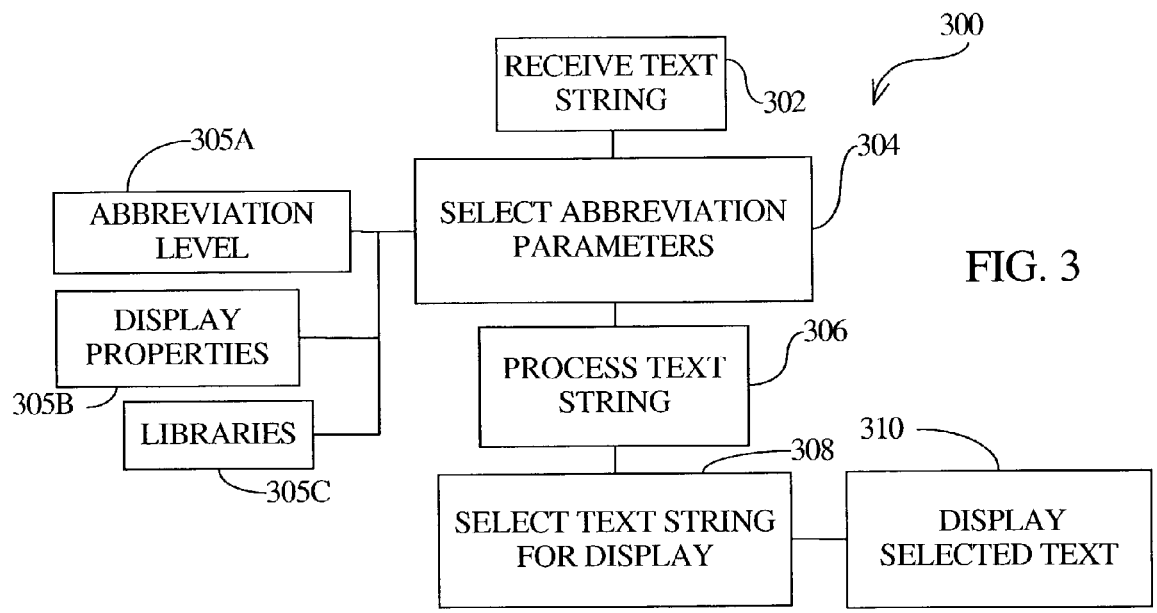
FIG. 3 is a schematic block diagram illustrating a text processing method.

A representative text processing method 300 is illustrated in FIG. 3. In a step 302, a text string is received for processing. In a step 304, processing parameters are selected. These processing parameters can be associated with, for example, display hardware properties, a degree of processing intended, availability of standard, custom, or shared abbreviation or rule libraries, and whether an unprocessed text string is to be retained in addition to a processed text string. For example, memories 305A, 305B, 305C can be configured to store abbreviation level parameters, display properties, and libraries, respectively. With processing parameters selected, the text is processed in a step 306 and the text string to be displayed is selected in a step 308. In a step 310, the selected text is displayed. Computer readable media can be configured to include computer-executable instructions for such text processing methods, or other applications that include such text processing.

Text processing methods can be associated with a graphical user interface such that provided with a MICROSOFT WINDOWS operating system or other operating system. Generally such graphical user interfaces display an object on a display screen and a text processing function is associated with the displayed object. For example, the displayed object can be associated with display of abbreviated text or full text, selection of abbreviation level, or selection or customization of one or more rule or abbreviation libraries. A user input based on the displayed object activates execution of such functions. In some examples, a menu of functions is displayed.

Figure 4A:
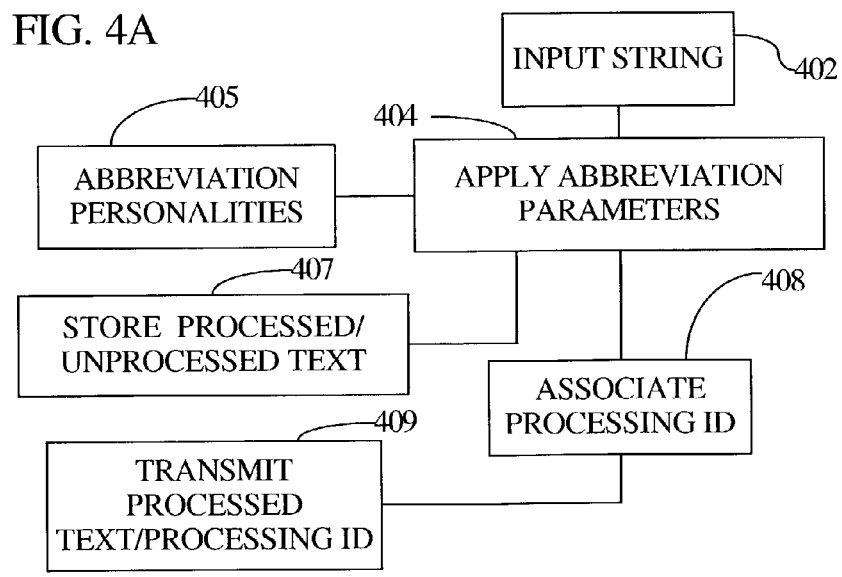
FIG. 4A is a schematic block diagram illustrating text processing at a mobile station.

With reference to FIG. 4A, a text processing method 400 configured for execution at a mobile station at which a message is prepared includes a step 402 of receiving message source text produced using, for example, a keyboard, a touchpad, a writing area on a personal digital assistant, a mouse or other pointing device with a displayed keyboard, or other device. One or more user personalities are retrieved from a memory 405 or obtained from a wireless or other network node, and abbreviation parameters associated with the user personalities are applied to the input text in a step 404. Processed text and/or unprocessed text can be stored in a memory 407 and the processed text is transmitted in a step 409. An abbreviation identifier can be associated with the processed text in a step 408, and transmitted to a recipient or a network node in the step 409. The abbreviation identifier can indicate that a text string has been processed, or can indicate a processing extent as well as identifiers associated with some or all parameters associated with the processed text. In addition, the abbreviation identifier can indicate whether the associated unprocessed text is available.

Figure 4B:
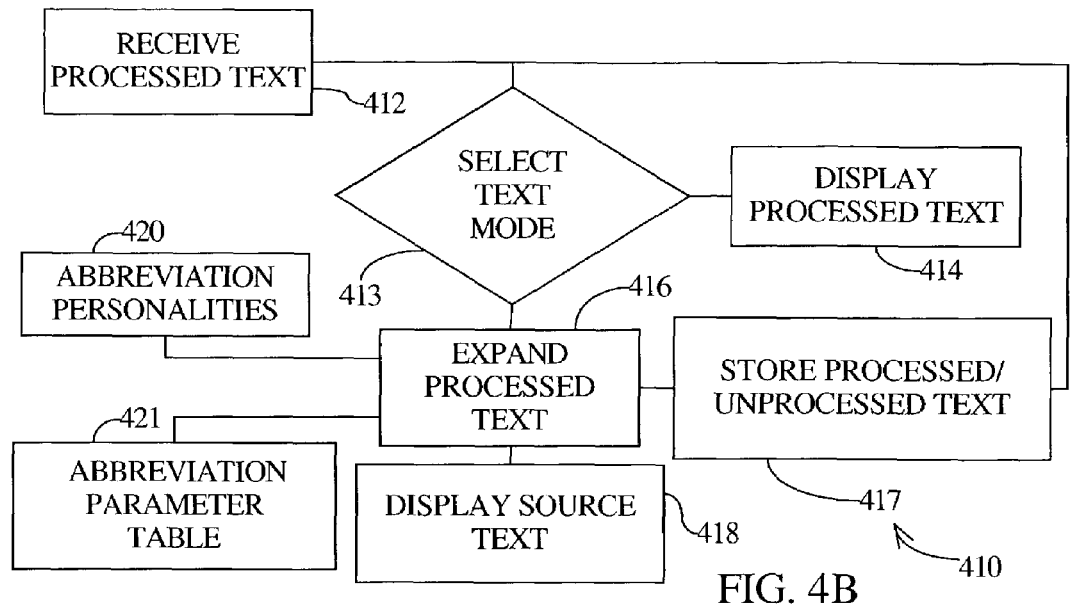
FIG. 4B is a schematic block diagram illustrating text expansion at a mobile station.

With reference to FIG. 4B, a method 410 of processing abbreviated text at, for example, a mobile station includes receiving abbreviated text in a step 412 and selecting source text or abbreviated text for display in a step 413. If display of abbreviated text is selected, the abbreviated text is directed to a display in a step 414. The abbreviated message can be stored in a step 417 based on, for example, a user configuration parameter for all messages, or a user configuration parameter based on message properties such as length, sender, number and identity of other recipients, time of transmission, time of reception, or other message property. A processor at a recipient mobile station is configured to process the received abbreviated text and display message source text based on an abbreviation personality library 420 and/or an abbreviation parameter table 421 that can be based on a sender identification, message length, abbreviation level, or other parameters. The message source text, or partially recovered message source text is displayed in a step 418 and can be stored in the step 417.

User personalities can be based on sender preferences, recipient preferences, hardware and/or software configuration in a mobile station or other device. For example, a user personality can be configured so that messages to selected recipients are abbreviated based on a private library. The user personality for such a personal library can provide identification of recipients to be associated with such a private user personality. The personal library can also include abbreviations for terms that common to group members, or abbreviation can be avoided for recipients for whom abbreviated messages pose difficulties. Messages to other recipients can be abbreviated based on generic abbreviation conditions, or only slightly abbreviated so that they are easily understood.

Figure 5A:
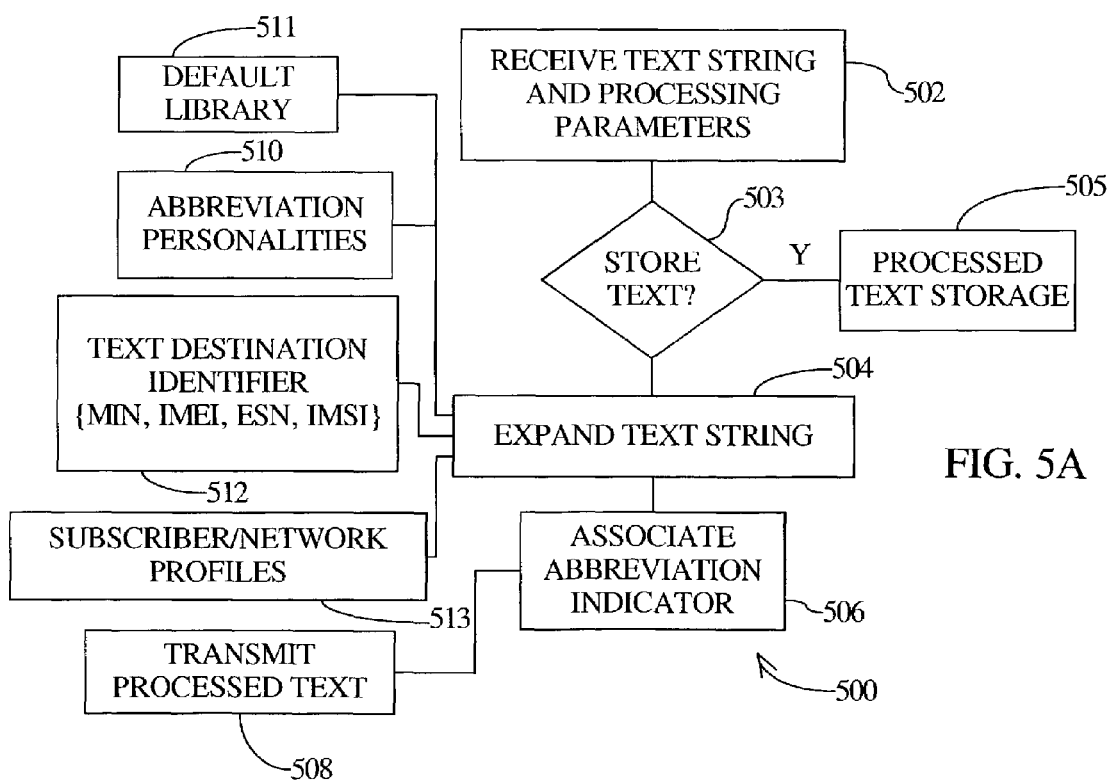
FIG. 5A is a schematic block diagram illustrating text processing at a network element.

With reference to FIG. 5A, a network element such as a base station controller (BSC), a mobile switching center (MSC), gateway mobile services switching center (GMSC) receives a text message or text string from another network element or a mobile station in a step 502, and determines if the text message is to be stored in a step 503. A memory 505 located at the network element or at other network or remote location is configured to store the received text message or string. The received text string is processed in a step 504 based on one or more abbreviation personalities 510, a default rule or text library 511, text destination identifiers 512, or subscriber/network profiles 513. Representative text destination identifiers include a Mobile Identification Number (MIN), an International Mobile Subscriber Identity (IMSI), an Electronic Serial Number (ESN), or an International Mobile Equipment Identifier (IMEI). The MIN typically corresponds to a phone number assigned to a user by a carrier. The IMSI typically permits user identification and includes fields associated with a carrier and a home country. The ESN typically identifies a mobile station based on a manufacturer code and a manufacturer-assigned serial number. The IMEI is typically a serial number assigned to a mobile station for identification. These or other text destination identifiers can be configured, for example, so that text processing in the step 504 is based on a recipient identity, equipment used by a recipient, or a combination thereof. In other examples, text processing can be based on properties of other network elements, network capacity, network congestion, or based on a subscriber service profile that indicates services available to the message originator. An abbreviation indicator can be associated with the processed text in a step 506, and the processed text transmitted to a recipient or another network element in a step 508. The processed text can be transmitted with or without the abbreviation indicator. If the abbreviation indicator is available to the recipient mobile station (or network element), the text processing of the step 504 can be reversed or partially reversed, either automatically based on an abbreviation personality associated with a network element, a recipient, communication equipment, or network capacity or capabilities. Alternatively, a recipient can request a less abbreviated version in order to confirm or clarify the received processed text. In addition, if messages are abbreviated to avoid network congestion, the recipient can request that unprocessed message text be delivered when network congestion is relieved. The abbreviation indicator can be associated with abbreviation extent or identify specific libraries used for text shortening.

Figure 5B:
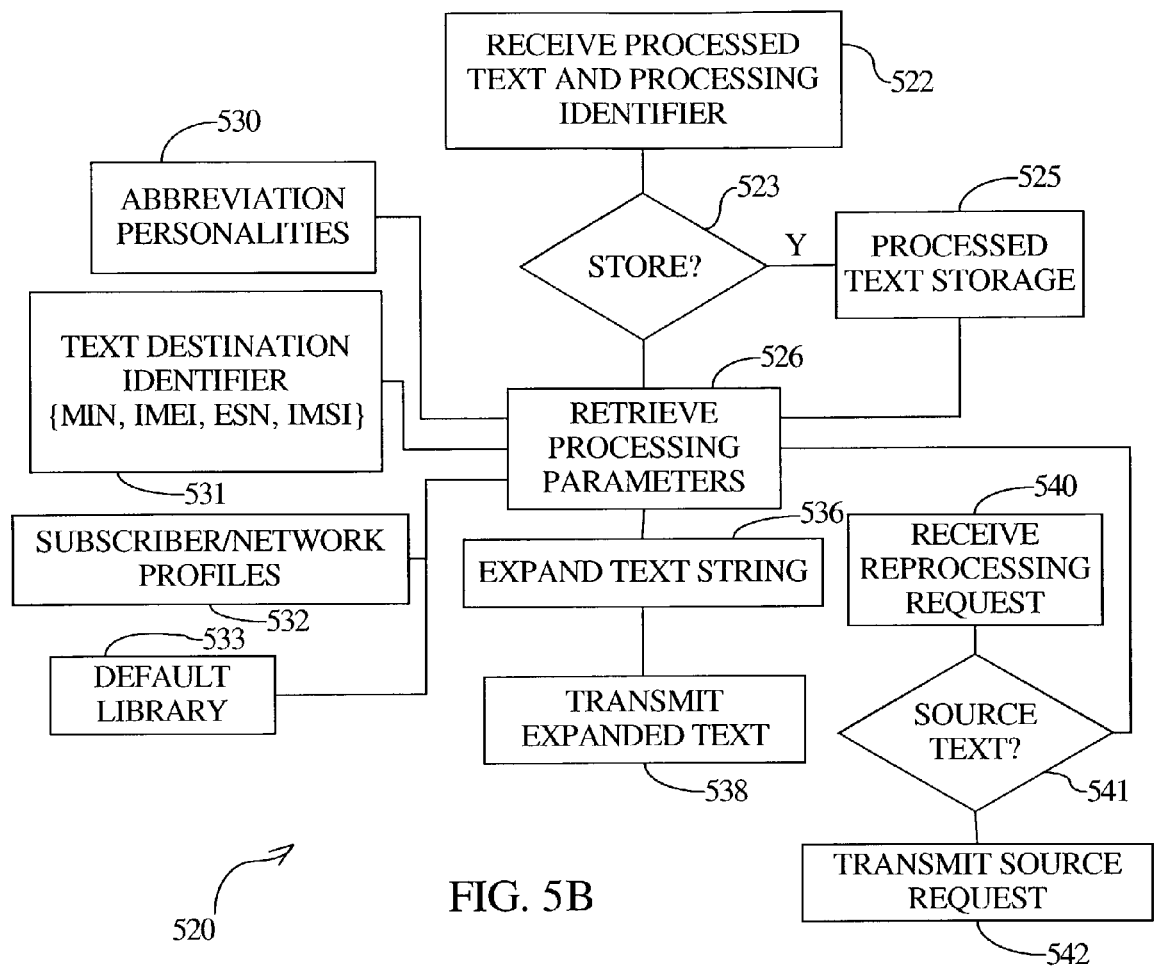
FIG. 5B is a schematic block diagram illustrating text expansion at a network element.

Referring to FIG. 5B, a method 520 of expanding a processed text at, for example, a network element or a mobile station, includes receiving the processed text and a processing identifier in a step 522. If desired, the processed text is stored in a memory 525 in a step 523. In a step 526, processing parameters are retrieved from memories 530, 531, 532, 533 that are configured to store abbreviation personalities, text destination identifiers, subscriber and/or network profiles, or default processing parameters, respectively. Typically, some processing parameters can be selected based on the abbreviation identifier. In addition, the abbreviation parameter can be configured to indicate the availability of unprocessed text. In a step 536, the processed text is expanded and in a step 538 the expanded text is transmitted. In some examples, text expansion is based on a request by a recipient received in a step 540 that typically includes an abbreviation expansion identifier that is associated with an extent of expansion, associated expansion/abbreviation parameters, or a request for transmission of unprocessed text. In a control step 541, a determination is made if source text is requested. If so, a request for source text is transmitted in a step 542. Otherwise, processing parameters are retrieved in the step 526 for additional expansion in the step 536. In some examples, the expanded text is returned with the request for further processing. Alternatively, stored processed text can be retrieved from the memory 525.

It will be appreciated that the examples described above can be modified in arrangement and detail. For example, text processors can be associated with text origination, text reception, or at locations between text origination and text reception. For example, a wireless network can include a text processor associated with a network messaging center. Based on network settings or configuration parameters supplied by a network subscriber, text messages can be abbreviated for transmission to a recipient. Messages intended for a subscriber can also be abbreviated based on configuration parameters stored at a user mobile station such as a cellular phone, a personal digital assistant, a palm-top computer, or other mobile device that communicates over an air interface. Alternatively text processor settings can be stored at a network message center or other network location. Text processors can be provided as computer-executable instructions for use with liquid crystal or other computer-based projection systems, laptop computers, handheld computers, or other devices. In addition, text processors can be configured to process web pages, word processor documents, spreadsheets, or be associated with applications such as terminal emulators and email applications that use text.

In other examples, message sources and message receivers can be associated with wireless communication devices such as mobile stations, wireless personal digital assistants, personal computers and laptop computers that communicate via a wireless network, other computers that communicate via a wired network, or other devices. For example, a message source can be a personal computer that is configured to transmit a message that is intended for a recipient via an air interface. Alternatively, a mobile station can be configured to produce a text message that is directed to a personal computer. Text processing can be provided at the personal computer, a network element of a wired or wireless portion of a network, a server, at a mobile station, or other location. In some examples, text processing can be provided at several locations. Abbreviation parameters can be stored locally or in a wired or wireless network, or entered manually. Processing identifiers can be communicated as one or more identification bits or identification words that are associated with processing extent and/or processing libraries, processing classes, or processing rules that are to be applied or that have been applied. In view of these representative examples, I claim all that is encompassed by the appended claims.

I claim:

1. A text messaging system, comprising:
    an input to receive a message;
    a memory configured to store a mobile equipment identifier associated with a message destination;
    the memory further configured to store a plurality of abbreviation personality libraries;
    a controller configured to receive from a user selection device a selection of one of the abbreviation personality libraries;
    a message abbreviator configured to produce an abbreviated version of the message based on the mobile equipment identifier and the selected abbreviation personality library, wherein the abbreviated message is a short message service message; and
    an output configured to send the abbreviated message to a message destination.

2. The text messaging system of claim 1, wherein the mobile equipment identifier is an International Mobile Equipment Identifier (IMEI).

3. The text messaging system of claim 1, wherein the mobile equipment identifier is an Electronic Serial Number (ESN).

4. The text messaging system of claim 1, wherein a maximum short message service message length is 160 characters.

5. The text messaging system of claim 1, wherein the abbreviation personality library comprises at least one of a private abbreviation library and a message destination device configuration.

6. The text messaging system of claim 1, wherein the abbreviation personality library includes a plurality of message destinations associated with a group of members, and an abbreviation library based on preferences of the group members.

7. The text messaging system of claim 6, wherein the abbreviation personality library includes abbreviations to be avoided for at least one message recipient.

8. The text messaging system of claim 1, further comprising an input configured to receive at least one abbreviation parameter from the message destination, and the abbreviation personality library is updated based on the at least one abbreviation parameter from the message destination.

9. The text messaging system of claim 8, wherein the abbreviation personality library includes a plurality of message destinations associated with a set: of group members and an abbreviation library based on preferences of the group members.

10. The text messaging system of claim 9, wherein the input is configured to receive a request to add a message destination associated with an additional group member.

11. The text messaging system of claim 9, wherein a plurality of abbreviated messages are produced for a plurality of message recipients based on corresponding abbreviation parameters in the abbreviation personality library.

12. The text messaging system of claim 1, wherein the abbreviation personality library includes a permitted message length for a device associated with the message destination.

13. The text messaging system of claim 1, wherein the abbreviation personality library includes a display capability of a device associated with the message destination, and the abbreviated message is based on the display capability.

14. A text messaging system, comprising:

a memory configured to store a mobile equipment identifier associated with a message destination and an abbreviation personality library that includes at least one abbreviation parameter associated with the message destination;

a message abbreviator configured to produce an abbreviated message based on the mobile equipment identifier and the abbreviation personality library, wherein the abbreviated message is a short message service message;

an output configured to deliver the abbreviated message to the message destination; and wherein the abbreviation personality library includes an indication that a full text message associated with the abbreviated message is to be delivered to the message destination.

15. A text messaging system, comprising:

an input to receive a message;

a message abbreviator configured to produce an abbreviated version of the message based on a mobile equipment identifier associated with a recipient of the message; and an output configured to send the abbreviated message to the recipient.

* * * * *